US006734252B1

(12) United States Patent
Woods

(10) Patent No.: US 6,734,252 B1
(45) Date of Patent: May 11, 2004

(54) MELT PROCESSABLE THERMOPLASTIC POLYMER COMPOSITION EMPLOYING A POLYMER PROCESSING ADDITIVE CONTAINING A FLUOROTHERMOPLASTIC COPOLYMER

(75) Inventor: Susan S. Woods, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/240,450

(22) Filed: Jan. 29, 1999

(51) Int. Cl.$^7$ .......................... C08L 25/02; C08L 23/00
(52) U.S. Cl. .................... 525/187; 524/377; 524/378
(58) Field of Search .................... 525/187; 524/377, 524/378

(56) References Cited

U.S. PATENT DOCUMENTS

| | | | |
|---|---|---|---|
| 2,968,649 A | 1/1961 | Pailthorp | 260/80.5 |
| 3,125,547 A | 3/1964 | Blatz et al. | 260/45.5 |
| 4,558,141 A | 12/1985 | Squire | 549/455 |
| 4,855,013 A | 8/1989 | Ohta et al. | 156/601 |
| 4,855,360 A | 8/1989 | Duchesne et al. | 525/187 |
| 4,904,735 A | 2/1990 | Chapman, Jr. et al. | 525/199 |
| 5,015,693 A | 5/1991 | Duchesne et al. | 525/187 |
| 5,064,594 A | 11/1991 | Priester et al. | 264/127 |
| 5,132,368 A | 7/1992 | Chapman, Jr. et al. | 525/165 |
| 5,284,184 A | 2/1994 | Noone et al. | 138/121 |
| 5,397,897 A | 3/1995 | Komatsu et al. | 250/338.4 |
| 5,464,904 A | 11/1995 | Chapman, Jr. et al. | 525/200 |
| 5,527,858 A | 6/1996 | Blong et al. | 525/187 |
| 5,550,193 A | 8/1996 | Chiu et al. | 525/199 |
| 5,587,429 A * | 12/1996 | Priester | 525/187 |
| 5,710,217 A * | 1/1998 | Blong | 525/199 |
| 5,830,947 A | 11/1998 | Blong et al. | 525/187 |

OTHER PUBLICATIONS

Rauwendaal, C., "Polymer Extrusion", Hanser Publishers, p. 23–48, 1986.
A. Rudin et al, "Fluorocarbon Elastomer Aids Polyolefin Extrusion", Plastics Engineering, Mar. 1986 at 63–66.
R. F. Westover, "Melt Extrusion", Encyclopedia of Polymer Science & Technology, vol. 8, pp 573–81 (John Wiley & Sons, 1968).
"Encyclopedia of Polymer Science and Technology", John Wiley & Sons, 1987, vol. 7, p. 257, *Fluorocarbon Elastomers*.

\* cited by examiner

*Primary Examiner*—Patricia A. Short
(74) *Attorney, Agent, or Firm*—James V. Lilly; Dean M. Harts

(57) ABSTRACT

A polymer processing aid composition, a melt processable thermoplastic hydrocarbon polymer composition that uses the polymer processing aid, and a method of improving the melt processability of a thermoplastic hydrocarbon polymer are provided. The polymer processing aid composition comprises a major amount of a fluorothermoplastic polymer that comprises interpolymerized units derived from vinylidene fluoride, at least one ethylenically unsaturated copolymerizable fluorinated monomer, and, optionally, at least one low molecular weight non-fluorinated olefin monomer.

23 Claims, No Drawings

MELT PROCESSABLE THERMOPLASTIC POLYMER COMPOSITION EMPLOYING A POLYMER PROCESSING ADDITIVE CONTAINING A FLUOROTHERMOPLASTIC COPOLYMER

FIELD OF THE INVENTION

This invention relates to a polymer processing additive that employs a tetrafluoroethylene copolymer and a poly (oxyalkylene) polymer, melt processable thermoplastic compositions that utilize this polymer processing additive, and methods of improving the melt processability of thermoplastic hydrocarbon polymers.

BACKGROUND

For any melt processable thermoplastic polymer composition, there exists a critical shear rate above which the surface of the extrudate becomes rough and below which the extrudate will be smooth. See, for example, R. F. Westover, *Melt Extrusion*, Encyclopedia of Polymer Science and Technology, Vol. 8, pp 573–81 (John Wiley & Sons 1968). The desire for a smooth extrudate surface competes, and must be optimized with respect to, the economic advantages of extruding a polymer composition at the fastest possible speed (i.e. at high shear rates).

Some of the various types of extrudate roughness and distortion observed in high and low density polyethylenes are described by A. Rudin, et al., *Fluorocarbon Elastomer Aids Polyolefin Extrusion*, Plastics Engineering, March 1986, at 63–66. The authors state that for a given set of processing conditions and die geometry, a critical shear stress exists above which polyolefins such as linear low-density polyethylene (LLDPE), high-density polyethylene (HDPE), and polypropylene suffer melt defects. At low shear rates, defects may take the form of "sharkskin", a loss of surface gloss, that in more serious manifestations appears as ridges running more or less transverse to the extrusion direction. At higher rates, the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. The authors state further that lowering the shear stress by adjusting the processing conditions or changing the die configuration can avoid these defects to a limited extent, but not without creating an entirely new set of problems. For example, extrusion at a higher temperature can result in weaker bubble walls in tubular film extrusion, and a wider die gap can affect film orientation.

Certain fluorocarbon processing aids are known to partially alleviate melt defects in extrudable thermoplastic hydrocarbon polymers and allow for faster, more efficient extrusion. U.S. Pat. No. 3,125,547 to Blatz, for example, first described the use of fluorocarbon polymer process aids with melt-extrudable hydrocarbon polymers wherein the fluorinated polymers are homopolymers and copolymers of fluorinated olefins having an atomic fluorine to carbon ratio of at least 1:2 and wherein the fluorocarbon polymers have melt flow characteristics similar to that of the hydrocarbon polymers.

U.S. Pat. No. 4,904,735 (Chapman, Jr. et al.) describes a fluorinated processing aid for use with a difficultly melt-processable polymer comprising (1) a fluorocarbon copolymer which at the melt-processing temperature of the difficultly melt-processable polymer is either in a melted form if crystalline, or is above its glass transition temperature if amorphous, and (2) at least one tetrafluoroethylene homopolymer or copolymer of tetrafluoroethylene and at least one monomer copolymerizable therewith wherein the mole ratio is at least 1:1, and which is solid at the melt-processable temperature of the difficultly melt-processable polymer.

U.S. Pat. No. 5,397,897 to Morgan et al. Describes the use of copolymers of tetrafluoroethylene and hexafluoropropylene having high hexafluoropropylene content as processing aids in polyolefins.

U.S. Pat. No. 5,064,594 to Priester et al., and U.S. Pat. No. 5,132,368 to Chapman, Jr. et al. describe the use of certain fluoropolymer process aids containing functional polymer chain end groups including —COF, —$SO_2F$, —$SO_2Cl$, $SO_3M$, —$OSO_3M$, and —COOM, wherein M is hydrogen, a metal cation, or a quaternary ammonium cation for use with a difficultly melt-processable polymer.

U.S. Pat. No. 5,464,904 to Chapman et al. discloses the use of a copolymer of tetrafluoroethylene and hexafluoropropylene with a polyolefin. The copolymer is partially crystalline, contains no more than 2% by weight hydrogen, has a melt viscosity of from $0.1 \times 10^3$ to $20 \times 10^3$ Pa.s, and has an end of crystalline melting ($T_m$(end)) of from 170° C. to 265° C. The only enhancement of melt-processability described in this patent is shown in Example 25 where a concentration of 1000 ppm of the fluoropolymer in linear low density polyethylene is said to reduce the extrusion pressure of the extrudable composition. There is no showing of a reduction in melt defects.

U.S. Pat. Nos. 5,015,693 and 4,855,013 to Duchesne and Johnson disclose the use of a combination of a poly (oxyalkylene) polymer and a fluorocarbon polymer as a processing additive for thermoplastic hydrocarbon polymers. The poly(oxyalkylene) polymer and the fluorocarbon polymer are used at such relative concentrations and proportions as to reduce the occurrence of melt defects during extrusion. Generally the concentration of the fluoropolymer is present at a level of from 0.005 to 0.2 weight percent of the final extrudate and the poly(oxyalkylene) polymer is present at a level of from 0.01 to 0.8 weight percent of the final extrudate. Preferably, the weight of the fluorocarbon polymer in the extrudate and the weight of the poly (oxyalkylene) polymer in the extrudate are in a ratio of 1:1 to 1:10.

U.S. Pat. No. 5,527,858 to Blong and Lavallée discloses a melt processable fluoroplastic composition that comprises a melt processable fluoroplastic polymer and a minor amount (i.e., less than 20% by weight) of a poly (oxyalkylene) polymer. The fluoroplastic polymer comprises interpolymerized units derived from vinylidene fluoride and at least one ethylenically unsaturated copolymerizable, fluorinated monomer. By combining the poly(oxyalkylene) polymer with the fluoroplastic polymer, the fluoroplastic polymer can be melt processed at relatively low melt temperatures to form extrudates such as fuel line hoses or tubing. This is achieved without the need to modify the chemical structure of the fluoropolymer, to raise the melt-processing temperature, or to extrude at lower line speeds or shear rates.

It has been discovered that mixing a composition comprising a fluorothermoplastic polymer and a poly (oxyalkylene) polymer with a melt processable thermoplastic hydrocarbon polymer is surprisingly effective in reducing melt defects such as sharkskin in thermoplastic hydrocarbon polymers, especially polyolefins, or in postponing these defects to higher extrusion rates than can be typically achieved without the use of such a composition. These results are achieved without alteration of the chemical structure of the thermoplastic polymer and without the need for resorting to conventional methods of reducing melt defecting such as raising the melt-processing temperature or extruding at slower line speeds and lower shear rates. The use of this composition is also effective in reducing die buildup within an extruder.

SUMMARY

Briefly, in one aspect, the present invention provides a melt-processable composition that comprises a major amount (i.e., at least 50% by weight) of a melt processable thermoplastic hydrocarbon polymer and a minor, but effective, amount of a processing additive that comprises (a) a fluorothermoplastic polymer containing interpolymerized units derived from (i) vinylidene fluoride, and (ii) at least two separate ethylenically unsaturated, copolymerizable fluorinated comonomers, and (iii) optionally at least one low molecular weight non-fluorinated alpha olefin comonomer, (i.e. ethylene or propylene), and (b) a poly(oxyalkylene) polymer.

In another aspect, the present invention provides a novel processing additive composition that comprises from about 50 to 80% by weight of the fluorothermoplastic polymer, and correspondingly from about 50 to 20 weight percent of the poly(oxyalkylene) polymer.

In yet another aspect, the present invention provides a method for improving the melt processability of a melt processable thermoplastic hydrocarbon resin by combining the thermoplastic hydrocarbon resin with an effective amount of the processing additive, blending the materials until there is preferably a uniform distribution of the processing additive in the thermoplastic hydrocarbon polymer, and melt processing the resulting blend.

DETAILED DESCRIPTION

The thermoplastic hydrocarbon polymers useful in the present invention include, but are not limited to, polyamides, polyimides, polyurethanes, polyolefins, polystyrenes, polyesters, polycarbonates, polyketones, polyureas, polyvinyl resins, polyacrylates and polymethylacrylates. A particularly useful class of thermoplastic hydrocarbon polymers are polyolefins. Such polymers may be obtained by the homopolymerization or copolymerization of olefins, as well as copolymers of one or more olefins and up to about 30 weight percent or more, but preferably 20 weight percent or less, of one or more monomers that are copolymerizable with such olefins, e.g. vinyl ester compounds such as vinyl acetate. The olefins may be characterized by the general structure $CH_2=CHR$, wherein R is a hydrogen or an alkyl radical, and generally, the alkyl radical contains not more than 10 carbon atoms, preferably from one to six carbon atoms. Representative olefins are ethylene, propylene, 1-butene, 1-hexene, 4-methyl-1-pentene, and 1-octene. Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halidemonomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrolidine monomers.

The thermoplastic hydrocarbon polymers also include the metallic salts of said olefin copolymers, or blends thereof, that contain free carboxylic acid groups. Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt. The thermoplastic hydrocarbon polymers also include blends of thermoplastic hydrocarbon polymers with other thermoplastic hydrocarbon polymers or blends thereof containing conventional adjuvants such as antioxidants, light stabilizers, fillers, antiblocking agents, and pigments.

Representative examples of thermoplastic hydrocarbon polymers useful in the present invention are polyethylene, polypropylene, poly(1-butene), poly(3-methylbutene), poly(4-methylpentene) and copolymers of ethylene with propylene, 1-butene, 1-hexene, 1-octene, 1-decene, 4-methyl-1-pentene, and 1-octadecene.

Representative blends of thermoplastic hydrocarbon polymers useful in the invention are blends of polyethylene and polypropylene, linear or branched low-density polyethylenes, high-density polyethylenes, and polyethylene and olefin copolymers containing said copolymerizable monomers, some of which are described above, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers.

The thermoplastic hydrocarbon polymers may be used in the form of powders, pellets, granules, or in any other extrudable form. The preferred thermoplastic hydrocarbon polymers of the invention are homopolymers of ethylene and propylene or copolymers of ethylene and 1-butene, 1-hexene, 1-octene, 4-methyl-1-pentene, propylene, vinyl acetate and methyl acrylate.

The fluorothermoplastic polymers employed in the process additives of this invention are semi-crystalline and have a peak melting temperature in the range of 80° C. to 350° C. They are polymers containing interpolymerized units derived from (i) vinylidene fluoride, and (ii) at least two separate ethylenically unsaturated, copolymerizable fluorinated comonomers, and (iii) optionally, at least one low molecular weight non-fluorinated alpha olefin monomer.

The ethylenically unsaturated copolymerizable fluorinated comonomer may be characterized according to the general structure:

$$CF_2=CXR^1$$

wherein:
X is a hydrogen or a halogen atom; and
R[1] is a halogen atom or is an alkyl, cyclic alkyl, or aryl group having from 1 to 10 carbon atoms, and preferably it is either a halogen atom or a group having 1 to 3 carbon atoms; R[1] groups may contain one or more heteroatoms such as oxygen or nitrogen and may be partially-, fully- or non-halogenated, for example with fluorine atoms, provided, however, that when X is a hydrogen atom, $R^1$ contains an allylic carbon atom relative to the α-unsaturation and that allylic carbon atom is not perfluorinated (i.e. the allylic carbon atom is not saturated with fluorine atoms).

The substantially nonfluorinated olefin (b) monomers copolymerized with the fluorinated (a) monomer or monomers may be characterized according to the general structure:

$$CH_2=CXR^2$$

wherein:

X is a hydrogen or a halogen atom; and $R^2$ is a hydrogen or a halogen atom with the proviso that $R^2$ and X are not both fluorine; $R^2$ may also be an alkyl, cyclic alkyl, or aryl group having from 1 to 10 carbon atoms; preferably $R^2$ is a hydrogen atom or a group having 1 to 3 carbon atoms; $R^2$ group may be partially-, fully- or non-halogenated, for example with fluorine atoms, and may contain one or more heteroatoms such as oxygen or nitrogen. $R^2$ preferably is nonfluorinated but may be fluorinated.

Representative fluorinated copolymerizable fluorinated comonomers are tetrafluoroethylene, hexafluoropropene, chlorotrifluoroethylene, 2-chloropentafluoropropene, perfluoroalkyl vinyl ethers, e.g. $CF_3OCF=CF_2$ or $CF_3CF_2CF_2OCF=CF_2$, dichlorodifluoroethylene, 1,1-dichlorofluoroethylene, and mixtures thereof Perfluoro-1,3-dioxoles may also be used. The perfluoro-1,3-dioxole monomers and their copolymers are described, for example, in U.S. Pat. No. 4,558,141 (Squire).

A preferred subclass of fluorothermoplastic polymers useful in the invention comprises fluoropolymers having interpolymerized units derived solely from (i) vinylidene fluoride, (ii) more than 25 weight percent of the ethylenically unsaturated copolymerizable fluorinated monomer having the general structure $$CF_2=CFR_f$$

wherein $R_f$ is H, F, Cl, or a perfluoroalkyl of 1 to 8, preferably 1 to 3, carbon atoms, and, (iii) optionally, minor amounts (i.e., less than 50% by weight of said fluoropolymer) of perfluoro(alkyl vinyl ether) having, for example, 1 to 4 carbon atoms, e.g., perfluoro(methyl vinyl ether).

A preferred class of the fluoropolymers used in this invention is derived by copolymerizing 30 to 70 wt %, preferably 35 to 65 wt % tetrafluoroethylene, 10 to 30 wt %, preferably 15 to 25 wt % hexafluoropropylene, and 5 to 50 wt %, preferably 15 to 45 wt % vinylidene fluoride. A subclass of the fluoropolymer useful in making blends of this invention are fluoroplastics which contain interpolymerized units derived from copolymerization of a monomer charge of 45 to 65 wt % tetrafluoroethylene, 10 to 20 wt % hexafluoropropylene, and 15 to 35 wt % vinylidene fluoride.

Commercial fluoropolymers which can be used in the invention are the THV Fluoroplastics, which are described in product bulletins 98 0211-7703-9(103.02)R1, 98 0211-7010-9, -7011-7, -7012-6, -7013-3, -7014-1, and -8100-7 of Dyneon LLC. Grades THV 200, THV 400, and THV 500 of these fluoroplastics have ASTM D 3418 melting ranges of 115°–125° C., 150°–160° C., and 165°–180° C., respectively, and ASTM D 1238 melt flow indices of 20, 10, and 10, respectively, at 265° C. and 5 kg.

The poly(oxyalkylene) polymer employed in the process additives of this invention include poly(oxyalkylene) polyols and their derivatives. A class of such poly(oxyalkylene) polymers may be represented by the general formula:

$$A[(OR^1)_xOR^2]_y$$

wherein:

A is an active hydrogen-free residue of a low molecular weight, initiator organic compound having a plurality of active hydrogen atoms (e.g., 2 or 3), such as a polyhydroxyalkane or a polyether polyol, e.g., ethylene glycol, glycerol, 1,1,1-trimethylol propane, and poly(oxypropylene) glycol;

y is 2 or 3;

$(OR^1)_x$ is a poly(oxyalkylene) chain having a plurality of oxyalkylene groups, $(OR^1)$, wherein the $R^1$ moieties can be the same or different and are selected from the group consisting of $C_1$ to $C_5$ alkylene radicals and, prefereably, $C_2$ or $C_3$ alkylene radicals, and x is the number of oxyalkylene units in said chain. Said poly(oxyalkylene) chain can be a homopolymer chain, e.g., poly(oxyethylene) or poly(oxypropylene), or can be a chain of randomly distributed (i.e., a heteric mixture) oxyalkylene groups, e.g., a copolymer of $—OC_2H_4—$ and $—OC_3H_6—$units, or can be a chain having alternating blocks or backbone segments of repeating oxyalkylene groups, e.g., a polymer comprising $-(OC_2H_4)_a-$ and $-(OC_3H_6)_b-$ blocks, wherein a+b=5 to 5000 or higher, and preferably 10 to 500.

$R^2$ is H or an organic radical, such as alkyl, aryl, or a combination thereof such as aralkyl or alkaryl, and may contain oxygen or nitrogen heteroatoms. For example, $R^2$ can be methyl, butyl, phenyl, benzyl, and acyl groups such as acetyl ($CH_3CO—$), benzoyl ($C_6H_5CO—$) and stearyl ($C_{17}H_{35}CO—$).

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g., stearate groups, ($C_{17}H_{35}COO—$). Other useful poly(oxyalkylene) derivatives are polyesters, e.g., prepared from dicarboxylic acids and poly(oxyalkylene) glycols. Preferably, the major proportion of the poly(oxyalkylene) polymer derivative by weight will be the repeating oxyalkylene groups, $(OR^1)$.

The poly(oxyalkylene) polyols and their derivatives can be those which are solid at room temperature and have a molecular weight of at least about 200 and preferably a molecular weight of about 400 to 20,000 or higher. Poly(oxyalkylene) polyols useful in this invention include polyethylene glycols which can be represented by the formula $H(OC_2H_4)_nOH$, where n is about 15 to 3000, such as those sold under the Carbowax trademark, such as Carbowax™ PEG 8000, where n is about 181, and those sold under the trade name Polyox, such as Polyox™ WSR N-10 where n is about 2272.

The amount of the processing additive employed in the melt processable composition is that which is effective to provide a desired reduction in the melt defect phenomena. The exact amount will depend upon a number of factors including the particular melt-processable thermoplastic hydrocarbon polymer used, the formulation of that thermoplastic hydrocarbon polymer (i.e., the amount and types of additives present), and the process conditions under which the composition is to be extruded.

Generally, the process additive is present in the melt-processable composition at a low concentration. However, this may vary depending upon whether the melt-processable composition is to be extruded into its final form (e.g., a film) or whether the melt-processable composition is to be used as a masterbatch and is to be further diluted with thermoplastic polymer before it is extruded into its final form. Generally, the process additive is present in the melt-processable composition at a concentration of from about 0.005 to about 50 weight percent. If the melt-processable composition is a masterbatch, the amount of process additive in the composition may vary between about 2 to 50 weight percent of the composition. If the melt processable composition is to be extruded into final form and is not further diluted by the addition of thermoplastic hydrocarbon polymer, the melt-processable composition typically contains a lower concentration of process additive, e.g., about 0.005 to 2 weight percent, and preferably about 0.01 and 0.2 weight percent of the melt-processable composition. In any event, the upper concentration of the process additive in the melt-processable composition generally is determined by economic limitations rather than by any adverse physical effect of the concentration of the processing aid.

The processing additive composition employed in the melt processable composition of the invention comprises at least 50 percent by weight of the fluorothermoplastic polymer and up to 50 percent by weight of the polyoxyalkylene polymer. That is, the weight ratio of the fluorothermoplastic polymer to the poly(oxyalkylene) polymer in the processing additive composition is at least 1:1. Generally, the processing additive composition comprises from 50 to 99.5 percent by weight fluorothermoplastic and correspondingly from 50 to 0.5 percent by weight poly(oxyalkylene). Preferably the processing additive composition comprises from 50 to 80 percent by weight fluorothermoplastic and correspondingly from 50 to 20 percent by weight poly(oxyalkylene). This composition represents a novel processing additive composition. Even more preferably, the processing additive composition comprises from 50 to 70 weight percent fluorothermoplastic and correspondingly from 50 to 30 percent by weight poly(oxyalkylene). A list of useful processing additive compositions is set out in Table 1. In the Table, and throughout the remainder of this description, FT means "fluorothermoplastic polymer" and PEO means "poly(oxyalkylene) polymer".

TABLE 1

| FT (Wgt %) | PEO (Wgt %) | Weight Ratio FT:PEO |
|---|---|---|
| 50 | 50 | 1:1 |
| 60 | 40 | 1:0.67 |
| 70 | 30 | 1:0.43 |
| 80 | 20 | 1:0.25 |
| 90 | 10 | 1:0.11 |
| 95 | 5 | 1:0.05 |
| 95.5 | 0.5 | 1:0.005 |

The melt processable composition of the invention can be prepared by any of a variety of ways. For example, the thermoplastic hydrocarbon polymer and the processing additive can be combined by any of the blending means usually employed in the plastics industry, such as with a compounding mill, a Banbury mixer, or a mixing extruder in which the processing additive are uniformly distributed throughout the hydrocarbon polymer. The processing additive and the hydrocarbon polymers may be used in the form, for example, of powders, pellets, or granules. The mixing operation is most conveniently carried out at a temperature above the melting point of the fluorothermoplastic polymer, though it is also feasible to dry-blend the components in the solid state as particulates and then cause uniform distribution of the components by feeding the dry blend to a twin-screw melt extruder.

The resulting melt-blended mixture can be pelleted or otherwise comminuted into a desired particulate size or size distribution and fed to an extruder, which typically will be a single-screw extruder, that melt-processes the blended mixture. Melt-processing typically is performed at a temperature from 180° to 280° C., although optimum operating temperatures are selected depending upon the melting point, melt viscosity, and thermal stability of the blend. Different types of extruders that may be used to extrude the compositions of this invention are described, for example, by Rauwendaal, C., "Polymer Extrusion," Hansen Publishers, p. 23–48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.), which description is incorporated herein by reference.

Blends of the fluorothermoplastic polymer and the poly(oxyalkylene) polymer component, may be compounded as a masterbatch in the thermoplastic hydrocarbon resin. The masterbatch subsequently may be diluted prior to melt-processing to effect a desired concentration of the processing additive in the composition to be melt-processed. The fluorothermoplastic polymer and/or the poly(oxyalkylene) polymer may alternatively be fed to an extruder directly as a fine powder, therein combining with the thermoplastic hydrocarbon. The fluorothermoplastic polymer and/or the poly(oxyalkylene) polymer component may be slurried or dissolved in a liquid and the resulting mixture may be blended with the hydrocarbon polymer to create a melt-processable composition.

The blended composition can contain conventional adjuvants such as antioxidants, antiblocks, pigments, and fillers, e.g. titanium dioxide, carbon black, and silica. Antiblocks, when used, may be coated or uncoated materials.

The following examples are offered to aid in a better understanding of the present invention. These examples are not to be construed as an exhaustive compilation of all embodiments of the present invention and are not to be unnecessarily construed as limiting the scope of this invention.

EXAMPLES

The following examples illustrate the polymer processing additives of the invention and melt processable thermoplastics that utilize them. The composition of the polymer processing additive (PPA) compositions employed in the examples is set out in Table 2.

TABLE 2

| Polymer Process Additive Compositions | | |
|---|---|---|
| PPA1 | FT | 100% by weight |
| PPA2 | FT | 70% by weight |
|  | Polyethylene glycol | 30% by weight |
| PPA3 | FT | 60% by weight |
|  | Polyethylene glycol | 40% by weight |
| PPA4 | FT | 50% by weight |
|  | Polyethylene glycol | 50% by weight |
| PPA5 | Fluoroelastomer | 30% by weight |
|  | Polyethylene glycol | 70% by weight |

The FT (fluorothermoplastic polymer) was derived from a monomer composition of about 60 weight % TFE, about 20 weight % $VF_2$, and about 20 weight % HFP.

The fluoroelastomer was derived from a monomer composition of about 60 weight % $VF_2$, and about 40 weight % HFP.

The polyethylene glycol used had a molecular of about 8000 and is represented by the formula $H(OC_2H_4)_nOH$ where n is about 181.

PPA5 is commercially available as Dynamar™ FX-5920A from Dyneon LLC, Oakdale, Minn.

The melt processable thermoplastic hydrocarbon resin employed in the examples was an octane linear low density polyethylene resin having a melt index of 0.85 and a density of 0.92.

Masterbatch compositions comprising the PPA or polyethylene glycol and the thermoplastic hydrocarbon resin were prepared by weighing the appropriate amount of fluoropolymer or polyethylene glycol and polyethylene, tumble blending them together and then running them through a twin screw-extruder at 190° C. The extruded blend was solidified by passing it through a water bath and then pelletized. The resulting pelletized masterbatch was then tumble blended and again run through the twin screw extruder, solidified and pelletized to ensure homogeneity.

The film compositions were made by tumble blending in the appropriate amount of a given fluoropolymer masterbatch (and polyethylene glycol masterbatch if appropriate) with the thermoplastic hydrocarbon resin. The resulting compositions were then run through a blown film line (182° C. (360° F.) feed, 221° C. (430° F.) flat temperature profile) at 600 sec$^{-1}$ shear rate. The initial concentration of PPA used was 400 parts per million (ppm). The concentration of PPA was increased by 200 ppm each hour until melt fracture was cleared. At 60 minutes, the concentration was increased to 600 ppm. At 120 minutes the concentration was increased to 800 ppm. The time needed to clear melt fracture was recorded. The results are shown in Table 3. The numbers reported in Table 3 reflect the % melt fracture at the given time.

A commercially available purge composition comprising 50 weight % thermoplastic hydrocarbon resin and 50 weight % calcium carbonate was used to purge the equipment of processing additives between each run. The base thermoplastic hydrocarbon resin was used to purge out the purge.

TABLE 3

| Time (min) | PPA1 | PPA2 | PPA3 | PPA4 | PPA5 |
|---|---|---|---|---|---|
| 0 | 100 | 100 | 100 | 100 | 100 |
| 15 | 100 | 95 | 100 | 90 | 100 |
| 30 | 100 | 35 | 100 | 60 | 50 |
| 45 | 85 | 1 | 95 | 35 | 25 |
| 60 | 60 | 0 | 50 | 25 | 3 |
| 75 | 50 | | 1 | 5 | 0 |
| 90 | 25 | | 0 | 0 | |

These results show the following:

A. PPA1 took 800 ppm and 150 minutes to clear melt fracture.

B. PPA5 (a commercially available material) took 600 ppm and 75 minutes to clear melt fracture.

C. PPA2, 3 and 4 each took 600 ppm to clear melt fracture. PPA2 cleared melt fracture at 60 minutes; PPA3 and PPA4 cleared melt fracture at 90 minutes.

This data shows that improved extrusion characteristics are achieved by the use of the polymer processing additives of the invention.

What is claimed is:

1. A melt processable polymer composition comprising:
   a major amount of a melt processable thermoplastic hydrocarbon polymer; and
   a minor amount of a processing additive composition comprising:
      (a) a fluorothermoplastic polymer containing units derived from a monomer charge of
         (i) vinylidene fluoride and,
         (ii) at least two separate ethylenically unsaturated copolymerizable fluorinated comonomers, and
         (iii) optionally at least one low molecular weight non-fluorinated alpha olefin monomer provided that when the low molecular weight non-fluorinated alpha olefin monomer is present, the vinylidene fluoride comprises at least about 20 weight percent of the monomer charge used to prepare the fluorothermoplastic polymer; and
      (b) a poly(oxyalkylene) polymer wherein the weight ratio of said fluorothermoplastic polymer to said poly(oxyalkylene) polymer is from about 1:0.11 to about 1:0.005.

2. A melt processable polymer composition according to claim 1 wherein the fluorothermoplastic polymer in the processing additive composition comprises at least one low molecular weight non-fluorinated alpha olefin monomer and wherein the vinylidene fluoride comprises at least about 20 weight percent of the monomer charge used to prepare the fluorothermoplastic polymer.

3. A melt processable polymer composition according to claim 1 wherein the fluorothermoplastic polymer in the processing additive composition consisting essentially of units derived from (i) vinylidene fluoride and (ii) the ethylenically unsaturated copolymerizable fluorinated comonomers.

4. A melt processable polymer composition according to claim 1 wherein the ethylenically unsaturated copolymerizable fluorinated comonomers have the general structure

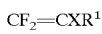

wherein X is a hydrogen or a halogen atom; and
$R^1$ is a halogen atom or is an alkyl, cyclic alkyl, or aryl group having from 1 to 10 carbon atoms.

5. A melt processable polymer composition according to claim 4 wherein the comonomers of the formula $CF_2=CXR^1$ are selected from the group consisting of a perfluoroalkylvinyl ether having from 1 to 8 carbon atoms, tetrafluoroethylene, hexafluoropropylene, chlorotrifluoroethylene and 2-chloropentafluoropropene.

6. A melt processable polymer composition according to claim 4 wherein thermoplastic fluoropolymer comprises units derived from vinylidene fluoride, tetrafluoroethylene, and hexafluoropropylene.

7. A melt processable composition according to claim 1 wherein the hydrocarbon polymer comprises from about 50 to 99.995 weight % of the composition.

8. A melt processable composition according to claim 1 wherein the hydrocarbon polymer is a polyolefin.

9. A melt processable polymer composition comprising:
   a major amount of a melt processable thermoplastic hydrocarbon polymer; and
   a minor amount of a processing additive composition consisting essentially of:

(a) a fluorothermoplastic polymer containing units derived from a monomer charge of
   (i) vinylidene fluoride and,
   (ii) at least two separate ethylenically unsaturated copolymerizable fluorinated comonomers, and
   (iii) optionally at least one low molecular weight non-fluorinated alpha olefin monomer provided that when the low molecular weight non-fluorinated alpha olefin monomer is present, the vinylidene fluoride comprises at least about 20 weight percent of the monomer charge used to prepare the fluorothermoplastic polymer; and
(b) a poly(oxyalkylene) polymer wherein the weight ratio of said fluorothermoplastic polymer to said poly(oxyalkylene) polymer is from below about 1:0.25 to about 1:0.005.

10. A melt processable polymer composition according to claim 9 wherein the fluorothermoplastic polymer in the processing additive composition comprises at least one low molecular weight non-fluorinated alpha olefin monomer and wherein the vinylidene fluoride comprises at least about 20 weight percent of the monomer charge used to prepare the fluorothermoplastic polymer.

11. A melt processable polymer composition according to claim 9 wherein the fluorothermoplastic polymer in the processing additive composition consists essentially of units derived from (i) vinylidene fluoride and (ii) the ethylenically unsaturated copolymerizable fluorinated comonomers.

12. A melt processable polymer composition according to claim 9 wherein thermoplastic fluoropolymer comprises units derived from vinylidene fluoride, tetrafluoroethylene, and hexafluoropropylene.

13. A melt processable composition according to claim 9 wherein the hydrocarbon polymer comprises from about 50 to 99.995 weight % of the composition.

14. A melt processable composition according to claim 9 wherein the hydrocarbon polymer is a polyolefin.

15. A method for reducing melt defects in melt processable thermoplastic hydrocarbon polymer compositions which comprises admixing a melt processable thermoplastic hydrocarbon polymer with an effective amount of a polymer processing additive composition selected from
   (a) a composition comprising a fluorothermoplastic polymer containing units derived from a monomer charge of (i) vinylidene fluoride, and (ii) at least two separate ethylenically unsaturated copolymerizable fluorinated comonomers, and (iii) optionally at least one low molecular weight non-fluorinated alpha olefin monomer, provided that when the low molecular weight non-fluorinated alpha olefin monomer is present, the vinylidene fluoride comprises at least about 20 weight percent of the monomer charge used to prepare the fluorothermoplastic polymer, and a poly(oxyalkylene) polymer wherein the weight ratio of the fluorothermoplastic polymer to the poly(oxyalkylene) polymer is from about 1:0.11 to about 1:0.005, or
   (b) a composition consisting essentially of a fluorothermoplastic polymer containing units derived from a monomer charge of (i) vinylidene fluoride, and (ii) at least two separate ethylenically unsaturated copolymerizable fluorinated comonomers, and (iii) optionally at least one low molecular weight non-fluorinated alpha olefin monomer, provided that when the low molecular weight non-fluorinated alpha olefin monomer is present, the vinylidene fluoride comprises at least about 20 weight percent of the monomer charge used to prepare the fluorothermoplastic polymer, and a poly(oxyalkylene) polymer wherein the weight ratio of the fluorothermoplastic polymer to the poly(oxyalkylene) polymer is at least from about 1:0.11 to about 1:0.005
   mixing the polymer processing additive composition and the hydrocarbon polymer for a time sufficient to blend them together, and
   melt processing said admixture.

16. The method of claim 15 wherein the fluorothermoplastic polymer in the processing additive composition comprises at least one low molecular weight non-fluorinated alpha olefin monomer and wherein the vinylidene fluoride comprises at least about 20 weight percent of the monomer charge used to prepare the fluorothermoplastic polymer.

17. A method according to claim 15 wherein the poly(oxyalkylene) polymer is admixed with the melt processable thermoplastic hydrocarbon polymer prior to, simultaneously with, or subsequent to the admixture of the fluorothermoplastic polymer with the melt processable thermoplastic hydrocarbon polymer.

18. A method according to claim 17 wherein from 2 to 50 weight percent of the melt processable thermoplastic polymer composition comprises the polymer processing aid.

19. A method according to claim 17 wherein from 0.005 to 2 weight percent of the melt processable thermoplastic polymer composition comprises the polymer processing aid.

20. A method according to claim 17 wherein the hydrocarbon polymer comprises a polyolefin.

21. A method according to claim 17 wherein the fluorothermoplastic polymer is derived solely from vinylidene fluoride, tetrafluoroethylene and hexafluoropropylene.

22. The method of claim 15 wherein processing additive composition (b) is selected and the weight ratio of the fluorothermoplastic polymer to the poly(oxyalkylene) polymer is from about 1:0.25 to about 1:0.005.

23. A melt processable polymer composition comprising:
   a major amount of a melt processable thermoplastic hydrocarbon polymer; and
   a minor amount of a processing additive composition consisting essentially of:
   (a) fluorothermoplastic polymer containing units derived from a monomer charge of
      (i) at least about 20 weight percent vinylidene fluoride and, (ii) at least two separate ethylenically unsaturated copolymerizable fluorinated comonomers; and
   (b) poly(oxyalkylene) polymer wherein the weight ratio of said fluorothermoplastic polymer to said poly(oxyalkylene) polymer is from below 1:0.11 to about 1:0.005.

* * * * *

UNITED STATES PATENT AND TRADEMARK OFFICE
CERTIFICATE OF CORRECTION

PATENT NO. : 6,734,252 B1  
DATED : May 11, 2004  
INVENTOR(S) : Woods, Susan S.

Page 1 of 1

It is certified that error appears in the above-identified patent and that said Letters Patent is hereby corrected as shown below:

Column 10,  
Line 34, "consisting" should be shown as -- consists --

Signed and Sealed this

Twenty-third Day of November, 2004

JON W. DUDAS  
*Director of the United States Patent and Trademark Office*